United States Patent Office 3,010,383
Patented Nov. 28, 1961

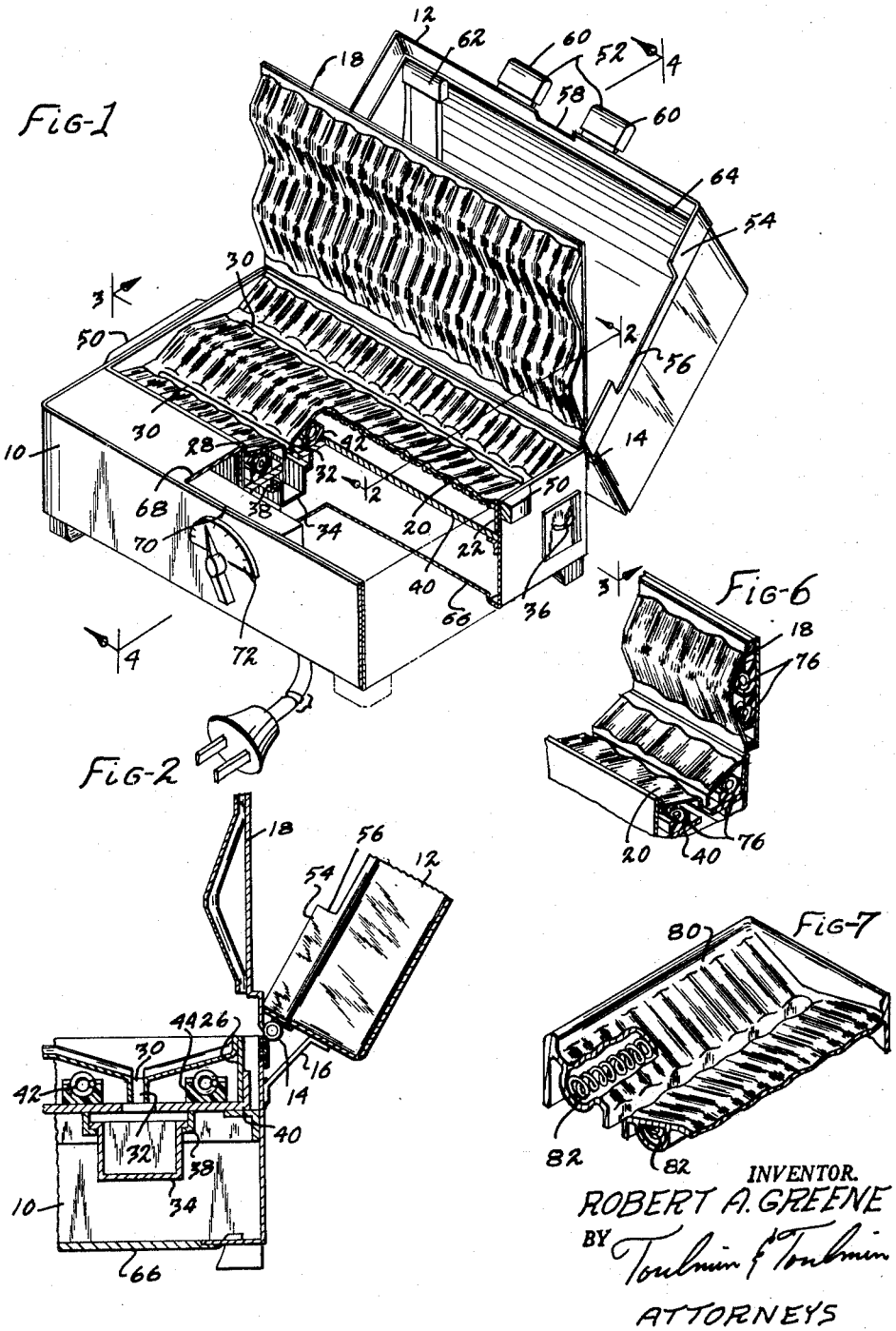

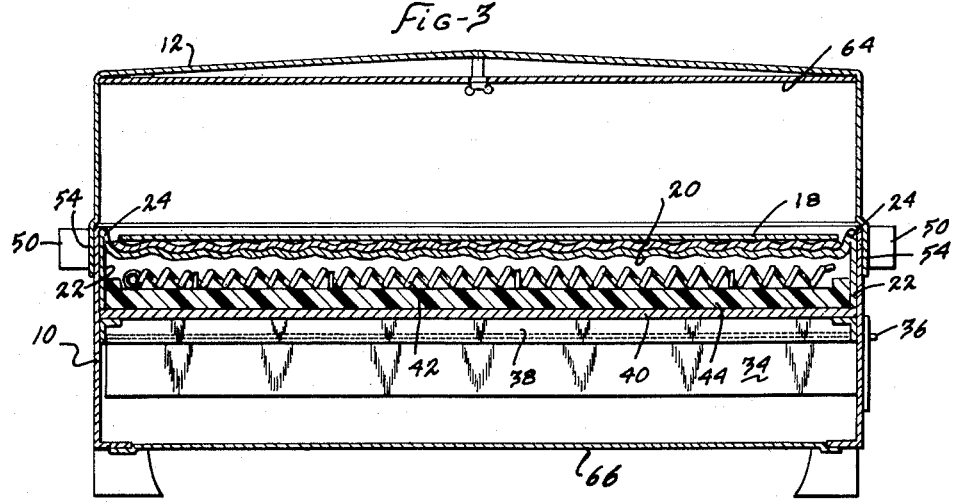

3,010,383
COOKING DEVICE
Robert A. Greene, Suite 4550 Seabreeze Blvd.,
Daytona Beach, Fla.
Filed Mar. 9, 1959, Ser. No. 797,902
7 Claims. (Cl. 99—332)

This invention relates to a cooking device and is particularly concerned with an apparatus for frying foods, particularly bacon.

The frying of bacon is usually accomplished in a skillet or on a hot plate and is always accompanied by certain difficulties particularly on account of the fat accumulating which is cooked out of the bacon or on account of the bacon twisting and curling as it cooks.

In order properly to cook bacon it becomes necessary continuously to drain the fat therefrom and also constantly to turn the bacon, this, however, does not completely offset the effects of the bacon curling which leads to parts of the bacon sometimes being undercooked and sometimes being overcooked.

Having the foregoing in mind, it is an object of this invention to provide improved apparatus in which bacon and like foods can be cooked without requiring close attention at all times.

Still another object of this invention is to provide an apparatus especially adapted for cooking bacon in which the natural tendency of the bacon to curl and twist during the cooking operation is simulated whereby the end result is a natural appearing product.

Still another object of this invention is the provision of a device for frying bacon in which the fat is continuously drained from the bacon thereby producing a superior end result.

A still further object is the provision of an apparatus for frying bacon and the like which is adapted for either domestic or commercial use which can be constructed in a variety of different ways.

It is also an object of this invention to provide a cooking apparatus of the nature referred to which is simple to operate, inexpensive to construct, and which can be kept clean and serviced readily.

These and other objects and advantages will become more apparent upon reference to the drawings in which:

FIGURE 1 is a perspective view showing a cooking apparatus according to this invention with the cover opened and with the top grid raised;

FIGURE 2 is a partial section indicated by line 2—2 on FIGURE 1;

FIGURE 3 is a transverse cross section indicated by line 3—3 on FIGURE 1;

FIGURE 4 is a sectional view indicated by line 4—4 on FIGURE 1 and is similar to FIGURE 2 except that in FIGURE 4 the lid and upper grid are closed;

FIGURE 5 is a diagrammatic view showing the connection of the heating elements to a control switch which is timer operated;

FIGURE 6 is a fragmentary perspective view showing the arrangement of the heating elements adjacent both the upper and lower grids;

FIGURE 7 is a fragmentary perspective view showing the formation of the grid with the heating elements integral therewith;

FIGURE 8 is a fragmentary view showing a grid having enamel coating thereon;

FIGURE 9 is a fragmentary sectional view showing somewhat diagrammatically the manner in which gas could be employed for heating the lower grid; and FIGURE 10 is a fragmentary perspective view showing a modified form of the upper grid which has perforations therein.

Referring to the drawings somewhat more in detail, the cooking device according to the present invention comprises a base portion 10 having lid or cover 12 hinged thereto as by hinge means 14. A stop member 16 may be provided against which the cover 12 comes to rest when open.

Hinge means 14 may also be availed of for hingedly supporting the upper grid member 18 which is substantially complementary in shape to a stationary grid member 20 carried in the base portion 10.

Both of the grid members 18 and 20 are formed so that in transverse cross section they define a plurality of adjacent V-configurations which are relatively shallow and across which configurations strips af bacon can be laid. These grids are also undulating from end to end and will best be seen in FIGURE 3 thereby improving the drainage of the fat from the bacon and also imparting a twisted crinkled appearance to the cooked product.

The lower grid 20 is preferably formed with leg portions 22 at the ends which connect with the grid portion proper by the bent back portions 24 so that at the ends the grid 20 has a straight edge part substantially flush with the top edge of the base 10.

Similarly as will be seen in FIGURE 4, the front and back edges of lower grid 20 may similarly be formed with vertical leg parts 26 and the folded over upper part 28. Edge part 28 is also substantially flush with the top edge of the base portion 10. The arrangement of the lower grid with the upstanding peripheral edge portion insures that fats cooked out of the bacon or like product will run down to the bottoms of the V's formed in the lower grid.

The fat is drained from the grid by means of elongated slots 30 formed along the bottoms of the V's and which slots preferably having drip nozzles 32 through which the fat drips to drop into trays 34 that are slidable out one end of base 10 as by the handles 36. Drip trays 34 may be slidably supported in the base 10 on ledge 38 that are suspended beneath a platform 40 extending transversely in base 10 beneatth lower grid 20. This platform is availed of for supporting heating element means 42 which is preferably electrically energized and which may be supported on the platform as by the ceramic members 44. Energization of the heating element means will cause relatively uniform heating of the grid 20. This grid is preferably of metal such as stainless steel but may also be formed of aluminum or copper by pressing techniques or may be cast aluminum either with a finished surface or with the surface formed thereon of copper, stainless steel or the like.

Further, the grid may consist of a heating surface consisting of aluminum or stainless steel with there being integral therewith a copper bottom surface for efficiency of heat transfer from the heating element through the cooking grid.

It is also possible for the grid to be formed of glass or for it to have an enameled surface. The last mentioned modification is indicated in FIGURE 8 wherein there is a metal grid 46 having an enamel coating 48 which may extend merely across the upper cooking surface or which may cover the entire grid.

The base portion 10 is provided with handles 50 by means of which they can be moved about and the cover portion 12 is also provided with handle means 52 so that it can readily be opened or closed.

The cover portion preferably comprises a dependent flange portion 54 that embraces the upper edge part of the base to prevent spattering of the grease.

This flange may be notched at 56 to accommodate handles 50 of the base portion and at the front may be notched as at 58 to accommodate the arm 60 attached to the upper cooking grid which extends forwardly therefrom and carries a handle 62.

Within the cover 12 there may also advantageously be provided an arcuate reflector member 64 which serves to reflect heat downwardly against the top grid 18 thereby conserving heat and preventing top cover 12 from becoming excessively hot.

The base portion 10 of the unit may be provided with a removable lower cover 66 so that access can be had to the underside of platform 40 for cleaning purposes.

The upper grid 18 has both of its sides readily accessible and lower grid 20, since it merely sits in a cavity in the base portion, can readily be lifted out for cleaning and to provide access to the heating element means.

Base 10 is formed with a compartment 68 in the front which receives a timing mechanism 70 having a control knob 72. This timing mechanism is availed of for controlling a switch so that when bacon or the like is placed on the fryer and the fryer is then closed the knob 72 can be turned to indicate a predetermined cooking time and when this time has expired a switch under the control of the timer will open. This is diagrammatically illustrated in FIGURE 5 wherein switch 74 which may be a mercury switch is wired in circuit with the heating element means 42, this switch is normally open but will close when control knob 72 is rotated and will remain closed until the knob is turned back to its zero position.

While for many installations a heating beneath the lower cooking grid is adequate, it is also possible to provide heating element means as at 76 pertaining to the top grid. These heating element means could be wired in circuit with the lower heating element means so as to be energized simultaneously therewith and this would provide for controlled temperature of both of the cooking grids for a more rapid and more uniform cooking operation.

FIGURE 7 illustrates a grid 80 in which a heating element means 82 is arranged so as to be integral. Grid 80, for example, may be cast aluminum and the heating element means 82 arranged in cored passage therein or within a tube welded to the grid so that the transfer of heat from the heating element to the grid is extremely efficient.

While electric heating of the grid is to be preferred on account of its convenience and economy, other heating means such as gas is also useable and a gas heated arrangement is diagrammatically illustrated in FIGURE 9.

In FIGURE 9 there is located beneath the lower grid the perforated gas supply tube 84 which supplies heat to the grid by means of a gas flame. The product of combustion may be collected at one or both ends of the lower grid and discharged through a stack 86 arranged at the back or end of the cooking unit. The gas fired unit could also be arranged for automatic operation by utilizing a time controlled valve in combination with either an electric igniter or with a continuously burning pilot flame.

In FIGURE 10 there is illustrated an upper grid member 90 having perforations 92. While it is generally preferred to use an unperforated upper grid, there may be cases where the perforated grid member of FIGURE 10 would produce better results. A grid member of this nature would preferably be provided with drain slots or apertures in the bottoms of the V's thereof so that any fats cooking up through the perforations would eventually drain into the drip trays.

While the grids have been referred to as undulating from end to end, and it is generally preferred that they be formed in this manner, it will be understood that grids free of undulations could be employed and the equivalent cooking results would obtain and the same advantages would be had. For bacon the undulating surfaces are preferred because of the appearance of the cooked product but the undulations have no substantial effect on the cooking operation itself.

It will be understood that this invention is susceptible to modification in order to adapt it to different usages and conditions; and, accordingly, it is desired to comprehend such modifications within this invention as may fall within the scope of the appended claims.

I claim:

1. In a bacon fryer; a lower frame part, a lower cooking grid having a vertically extending peripheral portion closely fitted in the upper portion of said lower frame part, said grid, inwarly from the said peripheral portion thereof having longitudinal surfaces angularly inclined to each other to form a series of shallow V's, the said surfaces being beneath the upper edge of said peripheral portion so that fats cooked out of the materials on the lower grid will run down to the bottoms of the V's, drain means extending through the grid in the bottoms of the V's, an upper grid hinged to the edge of the frame and movable into adjacent parallel relation with the lower grid and being complementary in cross sectional shape so as to define a cooking space between the grids that is of uniform height, said frame having a cover portion hinged thereon adapted for being closed down over the upper grid, and means for heating at least one of said grids, said grids being undulating in cross section in a direction parallel with the bottom of said V's.

2. In a bacon fryer; a lower frame part, a lower cooking grid having a vertical extending peripheral portion closely fitted in the upper portion of said lower frame part, said grid, inwardly from the said peripheral portion thereof having longitudinal surfaces angularly inclined to each other to form a series of shallow V's, the said surfaces being beneath the upper edge of said peripheral portion so that fats cooked out of the materials on the lower grid will run down to the bottoms of the V's, drain means extending through the grid in the bottoms of the V'e, an upper grid hinged to the edge of the frame and movable into adjacent parallel relation with the lower grid and being complementary in cross sectional shape so as to define a cooking space between the grids that is of uniform height, said frame having a cover portion hinged thereon adapted for being closed down over the upper grid, and timer controlled means for heating at least one of said grids, said grids being undulating in cross section in a direction parallel with the bottom of said V's.

3. In a fryer for bacon and the like, a frame or casing having a lower part and a cover hinged thereto, a lower cooking grid detachably mounted in the upper portion of the lower part of the frame, said grid comprising a series of relatively shallow V's in cross section, the periphery of the grid being extended upwardly to form a fat retaining edge part, there being a peripheral portion on the grid extending downwardly to support the grid within the frame, drain slots through the grid in the bottoms of said V's and removable trays in the frame therebeneath for catching fat dripping through the slots, an upper grid hinged to the frame independently of said cover, and time controlled means for supplying heat to at least one of said grids, said grids being undulating from end to end in the direction of said slots to assist in the drainage of fat from foods being cooked and to impart a crinkled appearance to the cooked foods.

4. In a fryer for bacon and the like, a frame or casing having a lower part and a cover hinged thereto, a lower cooking grid detachably mounted in the upper portion of the lower part of the frame, said grid comprising a series of relatively shallow V's in cross section, the periphery of the grid being extended upwardly to form a fat retaining edge part, there being a peripheral portion on the grid extending downwardly to support the grid within the frame, drain slots through the grid in the bottoms of said V's and removable trays in the frame therebeneath for catching fat dripping through the slots, an upper grid hinged to the frame independently of said cover, and time controlled means for supplying heat to at least one of said grids, said grids being undulating from end to end in the direction of said slots to assist in the drainage of fat from foods being cooked and to impart a crinkled appearance to the cooked foods, said upper grid having perforations distributed thereover.

5. In a fryer for bacon and the like, a frame or casing having a lower part and a cover hinged thereto, a lower cooking grid detachably mounted in the upper portion of the lower part of the frame, said grid comprising a series of relatively shallow V's in cross section, the periphery of the grid being extended upwardly to form a fat retaining edge part, there being a peripheral portion on the grid extending downwardly to support the grid within the frame, drain slots through the grid in the bottoms of said V's and removable trays in the frame therebeneath for catching fat dripping through the slots, an upper grid hinged to the frame independently of said cover, and time controlled means for supplying heat to at least one of said grids, said grids being undulating from end to end in the direction of said slots to assist in the drainage of fat from foods being cooked and to impart a crinkled appearance to the cooked foods, said grids comprising pressed sheet metal members having an enamel coating fused thereon.

6. In a fryer for bacon and the like, a frame or casing having a lower part and a cover hinged thereto, a lower cooking grid detachably mounted in the upper portion of the lower part of the frame, said grid comprising a series of relatively shallow V's in cross section, the periphery of the grid being extended upwardly to form a fat retaining edge part, there being a peripheral portion on the grid extending downwardly to support the grid within the frame, drain slots through the grid in the bottoms of said V's and removable trays in the frame therebeneath for catching fat dripping through the slots, an upper grid hinged to the frame independently of said cover, and time controlled means for supplying heat to at least one of said grids, said grids being undulating from end to end in the direction of said slots to assist in the drainage of fat from foods being cooked and to impart a crinkled appearance to the cooked foods, at least one of said grids comprising a cast member having the heating means integral therewith.

7. In a fryer for bacon and the like, a frame or casing having a lower part and a cover hinged thereto, a lower cooking grid detachably mounted in the upper portion of the lower part of the frame, said grid comprising a series of relatively shallow V's in cross section, the periphery of the grid being extended upwardly to form a fat retaining edge part, there being a peripheral portion on the grid extending downwardly to support the grid within the frame, drain slots through the grid in the bottoms of said V's and removable trays in the frame therebeneath for catching fat drippings through the slots, an upper grid hinged to the frame independently of said cover, and time controlled means for supplying heat to at least one of said grids, said grids being undulating from end to end in the direction of said slots to assist in the drainage of fat from foods being cooked and to impart a crinkled appearance to the cooked foods, said cover being of substantial depth, and there being an arcuate member in the cover forming a heat reflecting surface above the upper grid and also forming an easily cleanable inside surface for said cover.

References Cited in the file of this patent

UNITED STATES PATENTS

| | | |
|---|---|---|
| 497,790 | Jenkins | May 23, 1893 |
| 1,422,835 | Condy | July 18, 1922 |
| 1,504,102 | Davis | Aug. 5, 1924 |
| 1,802,005 | Detwiler | Apr. 21, 1931 |
| 1,910,620 | Mabey | May 23, 1933 |
| 2,009,790 | Schroyer | July 30, 1935 |
| 2,191,275 | Fink | Feb. 20, 1940 |
| 2,361,285 | Gough | Oct. 24, 1944 |
| 2,652,766 | Cralle | Sept. 22, 1953 |
| 2,751,840 | Layton | June 26, 1956 |